United States Patent [19]

Griffis

[11] Patent Number: 5,005,258

[45] Date of Patent: Apr. 9, 1991

[54] METHOD AND APPARATUS FOR EVISCERATING SCALLOPS

[76] Inventor: Edgar E. Griffis, 70 S. Banana River Dr., Merritt Island, Fla. 32952

[21] Appl. No.: 523,782

[22] Filed: May 15, 1990

Related U.S. Application Data

[63] Continuation-in-part of Ser. No. 222,137, Jul. 21, 1988, Pat. No. 4,947,519.

[51] Int. Cl.$^5$ ............................................. A22C 29/00
[52] U.S. Cl. ........................................ 452/18; 452/19
[58] Field of Search .................. 17/48, 53, 74, 73, 46, 17/76, 71, 45

[56] References Cited

U.S. PATENT DOCUMENTS

| 2,778,055 | 1/1957 | Lapeyre et al. | 17/73 |
| 3,383,734 | 10/1970 | Lapeyre | 17/73 |
| 3,662,432 | 5/1972 | Wenstrom et al. | 17/53 |
| 3,706,113 | 12/1972 | Lapeyre et al. | 17/73 |
| 3,829,933 | 8/1974 | Lambert | 17/53 |
| 4,718,145 | 1/1988 | Silchenstedt | 17/73 |

Primary Examiner—Willis Little
Attorney, Agent, or Firm—Duckworth, Allen, Dyer & Doppelt

[57] ABSTRACT

A plurality of shucked shellfish are mechanically eviscerated utilizing a series of longitudinally aligned inclined channels, each channel formed of a power-driven roller and adjacent insert rollers, the insert rollers extending generally parallel and longitudinally aligned with each other. The frictional surfaces of the rollers and the spacing between adjacent rollers, or both, are controlled to effectively separate the soft shellfish viscerae from the soft adductor muscle of the shellfish without significant damage to the muscles.

18 Claims, 2 Drawing Sheets

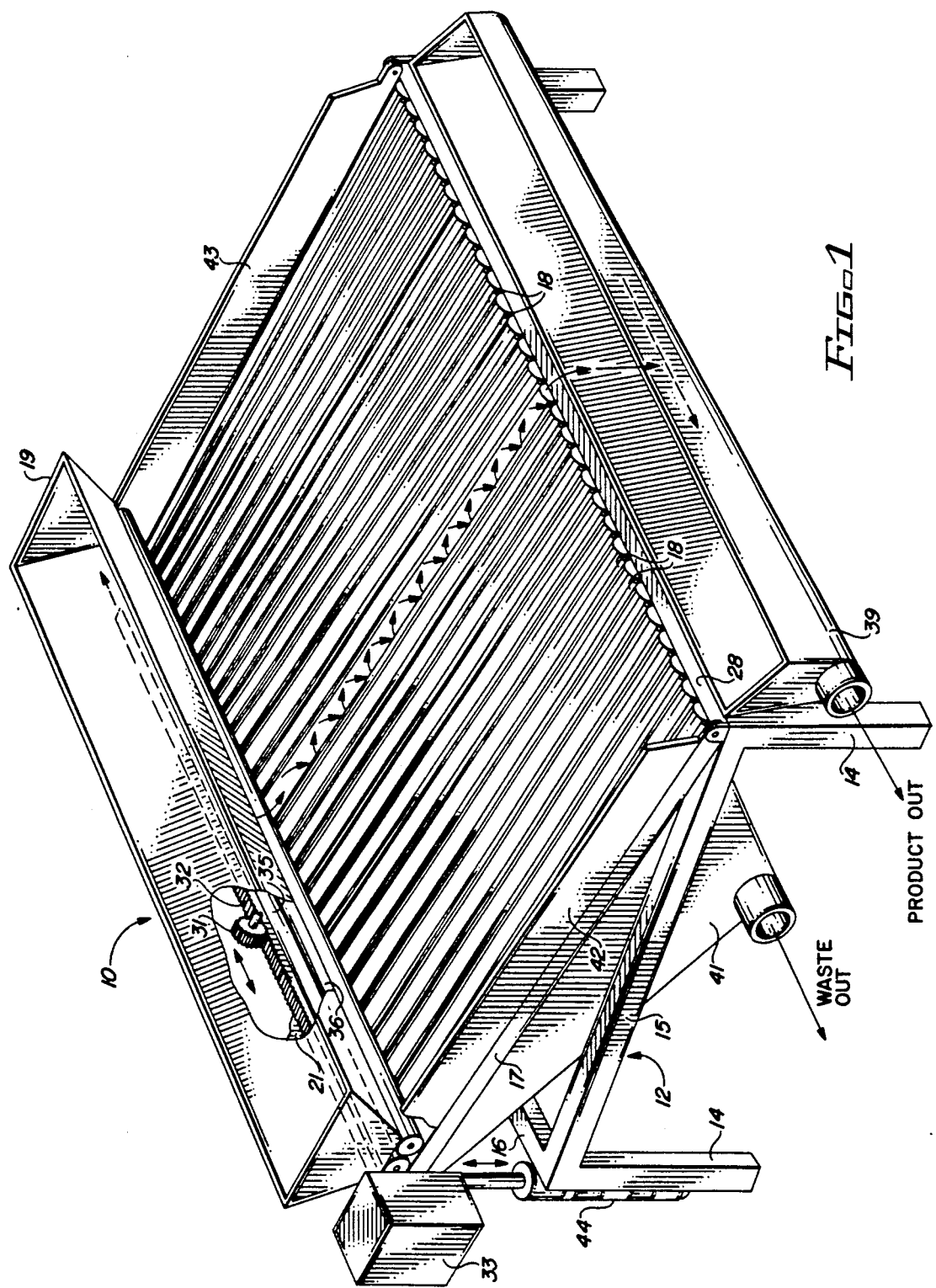

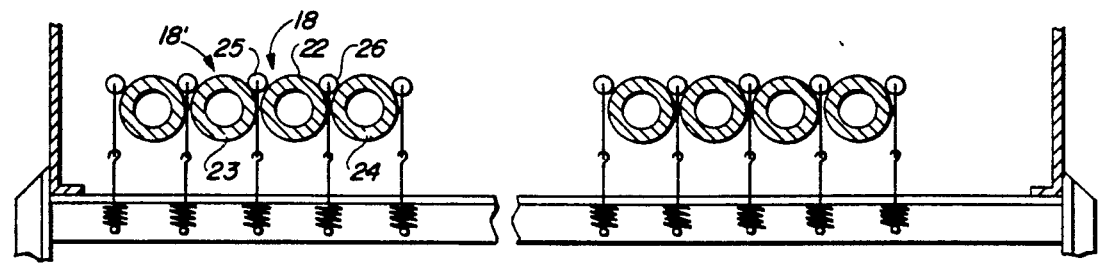
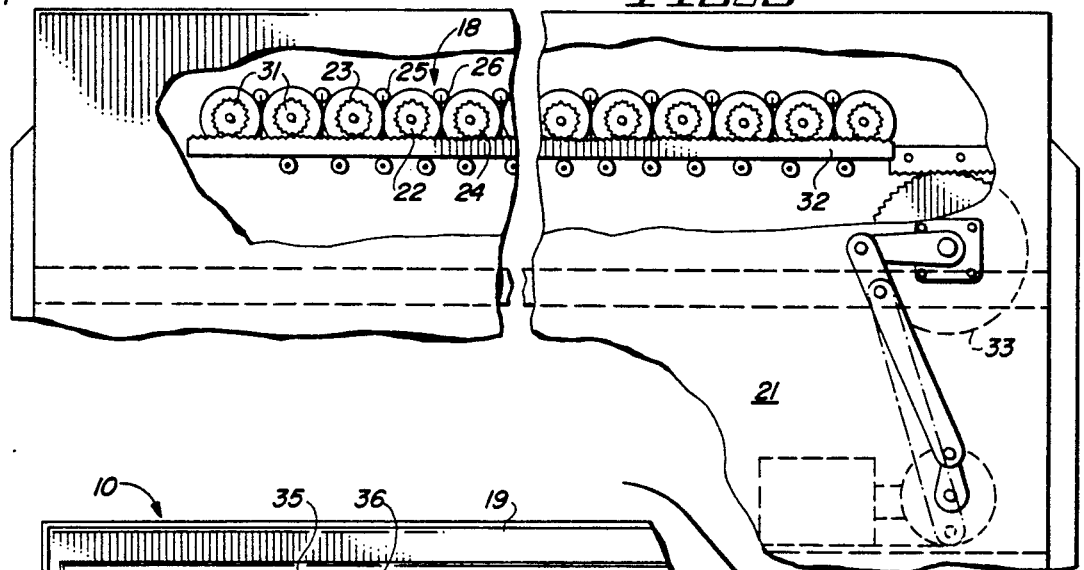
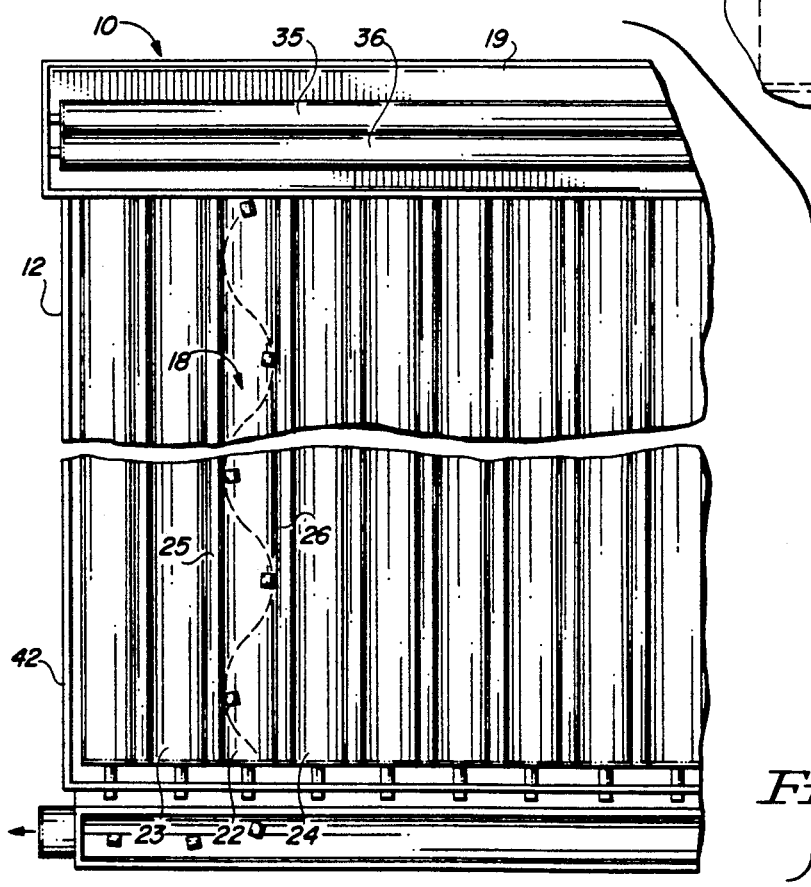

METHOD AND APPARATUS FOR EVISCERATING SCALLOPS

This application is a continuation-in-part of copending application Serial No. 222,137, filed July 21, 1988.

BACKGROUND OF THE INVENTION

This invention relates to the processing of shellfish, and more particularly relates to a method and apparatus for mechanically separating the viscera from the meat of shucked scallops.

Scallops, along with oysters, clams and mussels, are members of a group of marine shellfish called bivalve mollusks. Scallops have three major components: two hard outer shell sections or valves; viscera known as "rim"; and a single large adductor muscle (also known as the "meat" or "eye"). Also contained in the viscera are the eggs or ovaries, generally referred to as the "roe."

The commercial preparation of scallops for U.S. consumption involves shucking, followed by eviscerating. Shucking is the separation of the adductor muscle from the shell, and eviscerating is the separation in the shucked scallop of the viscera from the adductor muscle. Scallop eviscerating is distinguishable from shrimp peeling in that the former involves the separation of soft cylindrical muscle from soft, stringy viscera, while the latter involves the separation of soft edible meat from hard, plate-like shell segments.

In the commercial processing of scallops shucking and eviscerating are generally performed in two distinct operations, one continuously following the other. The method and apparatus of the present invention relate to the eviscerating procedure, and are not directly concerned with the means employed to shuck the scallops, the same being able to be accomplished by any of various well-known mechanical or hand shucking techniques.

Conventional methods and apparatus for mechanically eviscerating scallops are set forth in Willis U.S. Pat. Nos. 3,562,855, and Wenstrom et al. U.S. Pat. Nos. 3,665,554 and 4,532,677. The generally utilized method involves removing the viscera from the muscle employing a plurality of pairs of counter-rotating rollers, arranged to form an inclined path descending from the input end of the eviscerator table. Each of the rollers has its axis aligned transversely of the path and is positioned so that the surface of each intermediately positioned roller forms a nip with the adjacent roller on its input side and a nip with the adjacent roller on its output side. Drive means are provided for oscillating the rollers so that the upper exposed portion of adjacent rollers are alternately rotated toward each other to pull viscera from the scallop muscles and through the nip of the rollers, and alternately rotated away from each other to advance the scallops. The scallops move in the direction of the incline, substantially perpendicular to the axes of the rollers, being alternately pinched by the rollers and moved over the rollers from one roller to the next. A water spray is applied from above to the rollers to lubricate the rollers so that the scallop muscles rotate about their cylindrical axes.

There is an emphasis in conventional mechanical scallop eviscerating technology on moving the shucked scallops transversely over the roller pairs, down the direction of the incline. There has been an avoidance of eviscerating systems in which the scallops move longitudinally along rollers or roller channels, such as are known for mechanical shrimp peeling as illustrated by the equipment shown in the LaPeyre et al U.S. Pat. No. 2,778,055 of The Laitram Corporation, New Orleans, La., and other patents of the same assignee. Reported attempts by those involved in the development of systems, such as those shown in the Willis and Wenstrom et al patents, to adopt shrimp peeling techniques and machinery to scallop eviscerating have been unsuccessful and were abandoned, and both applicants and examiners involved with patenting of scallop eviscerating methods and apparatus have established positions that the same are involved in non-analogous art vis-a-vis shrimp peeling methods and apparatus.

SUMMARY OF THE INVENTION

The present invention provides a method and apparatus for the successful mechanical separation of viscera from meat of shucked scallops in which scallops are moved longitudinally along, rather than transversely over, rotating rollers. More particularly, the invention provides a system for mechanically separating the viscera from the meat of shucked scallops utilizing rolled configurations similar to those known for shrimp peeling processes.

In one aspect of the invention, scallops are introduced at a controlled rate adjacent the top of inclined, water lubricated channels formed between aligned frictionally-driven insert-rollers positioned at the nips between side-by-side, adjacently positioned power-driven rollers. The scallops are moved longitudinally down along the water lubricated channels by cyclically reversing the direction of the rollers, driving adjacent power-driven rollers in the same direction and indirectly driving the insert-rollers in the opposite direction by frictional contact with adjacent power-driven rollers. As the scallops descend, they move from side-to-side on each power-driven roller, causing the viscera of the scallops to be pinched and separated from the meat at the nips formed between that roller and the adjacent insert-rollers.

In a preferred embodiment of apparatus of the invention utilizable for practicing the method of the invention, described in greater detail below, power-driven and insert frictionally-driven rollers are arranged in aligned channels axially inclined in a configuration similar to that utilized for the upper peeling section of the Lapeyre et al '055 patent, mentioned above; however, without the necessity for side, power-driven rollers and with the roller nips set for scallop dimensions and the roller surfaces made to be less frictionally abrasive than roller surfaces normally employed in shrimp peeling equipment.

The apparatus of the invention provides utilization of the frictionally-driven rollers with fewer power-driven rollers, to give an efficient scallop cleansing operation.

The increased efficiency can readily be explained by the apparatus of the present invention employing only two tiers of rollers: a single tier of adjacent, side-by-side located channel base-forming power-driven rollers, and a tier of smaller diameter insert-rollers held for frictional drive between adjacent ones of the power-driven rollers. The power-driven rollers preferably rotate 180° and then reverses, while the frictional-driven insert-roller preferably rotates 360° and then reverses. With this arrangement, cleaning takes place on both sides of the frictionally-driven rollers. The frictionally-driven rollers are shared by the base rollers of two adjacent scallop cleaning channels so that the insert-rollers are being used for cleaning both for clockwise and counter-clockwise rotations.

A suitable eviscerating table in accordance with the present invention comprises a dual rack configuration of twenty-twenty-four inclined rubber-coated power-driven rollers, each 117 inches in length, and an equal number, less one, of smaller diameter frictionally-driven insert-rollers. Each insert roller has a rough outer surface and each is attached to an underlying rod by means of springs having means for tension adjustment.

BRIEF DESCRIPTION OF THE DRAWINGS

Embodiments of the invention have been chosen for purposes of illustration and description, and are considered in connection with the accompanying drawings, wherein:

FIG. 1 is an embodiment of apparatus for mechanically separating the viscera from the meat of shucked scallops, usable in practicing the method of the invention.

FIG. is a vertical transverse section taken at an enlarged scale along the line 2—2 of line 1.

FIG. 3 is an enlarged rear elevational view of the apparatus of FIG. 1 with portions of the back plate broken away showing the roller drive mechanism; and, FIG. 4 is a top plan view helpful in understanding the method of the invention employing the apparatus of the invention.

Throughout the drawing, like elements are referred to by like numerals.

DESCRIPTION OF THE PREFERRED EMBODIMENTS

The principles of the method and apparatus of the invention are illustrated in preferred embodiments thereof described with reference to the drawings, and particularly to FIGS. 1-3 which show an exemplary machine 10 for eviscerating shucked scallops or any shellfish. The machine 10 has a framework 12, having legs 14 and intervening structural members 15, 16 that support an inclined table or platform 17 on which a series of rollers is mounted to present aligned paths or channels 18 running generally longitudinally of the incline of the table and into which fresh, uncooked shucked scallops are received, for eviscerating thereof. The invention does not rely on any particular means for accomplishing the shucking and so discussion of the same is not necessary, the previously issued patent literature providing numerous examples of how shucking can be accomplished.

The scallops are delivered free from their shells to the machine 10 and deposited into a hopper or guide trough 19, through any appropriate agency, such as a flighted endless belt elevator like that disclosed in the Willis '855 patent. It may be preferable that the scallops be directly introduced onto channels 18 with a Laitram feeder tank manufactured by the Laitram Company of New Orleans, La. It is also preferred that the scallop shells be introduced uniformly across the width of the table surface to the scallop eviscerating apparatus and not be introduced bunched in any particular location on the table. The hopper 19 is positioned above the top ends of the channels 18 and extends across the width of the table 17, just ahead of a rear vertical wall 21 at the top of the incline.

In contrast to the apparatus disclosed in the parent application Ser. No. 222,137 in which the channels 18 are formed by groups or associations of five rollers to the unit, the channels 18 of the apparatus of the present invention are formed by groups of only three rollers, as described below. As many units as desired may be repeated transversely across the machine 10 to provide a machine 10 having a desired eviscerating capacity.

As shown in FIG. 2, the association of rollers in each path 18 comprises a power-driven roller 22 which forms the base of each channel and two frictionally-driven, insert-rollers 25 and 26 mounted respectively between the power-roller 22 and adjacently positioned identical power-driven rollers 23 and 24 which form the respective bases of adjacent channels. The power-driven rollers 22, 23 and 24 are mounted in the same way as the bottom rollers of the channel arrangement shown in the '137 application. The power-driven rollers 22, 23, 24 and the insert-rollers 25, 26 extend for substantially the full length of the machine 10, i.e. they do not stop midway. The power-rollers rollers 22, 23 and 24 are supported at the back wall 21 and at their lower ends by conventional means, and all of the rollers are inclined forwardly and downwardly from the back wall to the front beam 28 (although as with the structure of the '055 patent, an inclination is not essential where arrangements are made to compel travel down the channels under force of a stream of water as described in Le-Peyre et al U.S. Pat. No. 2,537,355).

As with the machinery of the '137 application and the '055 patent, the power-driven rollers 22, 23 and 24 all have fixed locations and are of a diameter which is large in comparison with the diameters of the insert-rollers 25, 26. The power-rollers 22, 23 and 24 are mounted relative to one another so that their peripheries are separated a distance at their nearest points which is somewhat less than the diameters of the insert-rollers 25, 26. This is for the purpose of enabling the insert-rollers 25, 26, which are not fixedly mounted but are resiliently supported in a manner similar to that disclosed for similar rollers in the machine of the '137 application, to be forcibly urged constantly by spring pressure of springs 27 into the restricted throats between the power-rollers 22 and the power-rollers 23, 24. The pressure springs 27 apply to insert-rollers 25 and 26 is controlled by changing the vertical position of arm 29. The spring pressure to which the insert-rollers 25, 26 is subjected is set to supply good frictional contact between each roller 22, the insert-rollers 25, 26 and the respective adjacent power-rollers 23, 24, and also to provide the desired nip or bight between the insert-rollers 25, 26 and the roller 22 to properly capture the viscera strings, as the scallops move longitudinally down along the channels 18 from side-to-side across the roller 22.

FIG. 2 shows eight of the rollers 22, 23, 24 mounted across the width of the machine in horizontally spaced, substantially parallel relation. As shown, the insert roller on the left of each channel 18 serves also as the insert roller on the right of the next adjacent channel 18'. Thus, all except the end insert-rollers 25, 26 serve as insert roller sides for the opposite sides of adjacent parallel channels 18. Unlike the corresponding channels of the '137 application, however, there is no second row of power-driven rollers.

Though only eight channels 18 are shown in FIG. 2, it will be appreciated that any number of channels may be utilized. A typical envisioned configuration will have 20 to 24 channels 18 and utilize rollers 22, 23 and 24 of identical 117-inch length and 3 inch diameter. The use of rollers of different diameter is, however, also possible.

The rollers 22, 23 and 24 are given an oscillating movement through a desired angular degree, such as one-half turn to one turn in each direction, through an appropriate actuating mechanism, such as the rack and gear drive arrangement shown in FIGS. 1 and 3. As shown, each power-driven roller 22, 23, 24 is mounted for free rotation at its lower end and is equipped with a pinion 31 at its upper end which engages a reciprocating tooth rack 32 accommodated adjacent the rear vertical wall 21, and driven by conventional drive means 33 to positively drive all the rollers 22, 23 and 24 in the same direction at the same time. Users of conventional mechanical scallop eviscerating systems (see Willis '855 and Wenstrom et al '432 and '554 patents) are used to rack and pinion drives; though, in contrast to the apparatus of the present invention, the conventional systems having adjacent rollers power-driven in counter-rotation are more complicated.

The insert-rollers 25, 26 are held in the nips between the rollers 22, 23, 24 by hold-down devices of conventional construction, such as disclosed in LePeyre et al U.S. Pat. No. 3,706,113, or preferably, as shown in FIG. 2. This hold-down device has a horizontally oriented arm 29 coupled to spring 27. Arm 29 is supported with guides 47 and 47' and screw 37 and 37', that are coupled to end plates 42 and 43 respectively, with arms 45 and 45'. Guides 47 and 47' hold arm 29 in place and provide a lateral support for arm 29 when it is moved vertically. Adjustment screws 37 and 37' are inserted into a socket formed in arm 29 to allow the vertical position of arm 29 to be adjusted by turning screws 37 and 37'. The force of engagement between the frictionally-driven rollers 25, 26 and the power-driven rollers 22, 23 and 24 is adjusted with screw 37 and screw 37' to provide nips on either side of roller 22 of each channel 18 which will perform satisfactory removal of the viscera.

The roller surfaces are chosen to have a frictional interaction that separates soft viscera from soft meat, without destroying the meat. This is contrary to the roller surface selection process for shrimp peeling machinery. It is common in shrimp peeling machines (see for example LePeyre et al U.S. Pat. No. 3,704,484) for the insert-rollers to be grooved or otherwise roughened and sharpened on their outer surfaces to better grasp the appendages of shrimp and the edges of shrimp shells during the peeling process. The use of such rough surfaces may be too abrasive for scallop eviscerating.

For the apparatus of the present invention, it may be preferable, for some applications, that the external cylindrical surfaces of the insert-rollers be much less abrasive. They may be suitably sandblasted to provide some roughness, but are not otherwise roughened or sharpened. The external surfaces of the power-driven rollers 25, 26 may, for example, approximate the worn down, sandblasted surfaces discussed as undesirable for shrimp peeling machines in the '484 patent. However, it may also be preferable, for other applications, that the external cylindrical surface of the insert-roller be knurled into a diamond pattern. It is preferable that when the insert-rollers are knurled, that the insert-rollers have a sufficient sharpness to remove the roe, but not enough sharpness to tear the meat. It is recognized that knurling the insert-rollers' surface in this matter may provide better removal of the roe in the viscera and may produce higher meat yields. The power-driven rollers 22, 23 and 24 may be rubber coated, or of other suitable composition, such as those commercially available for machinery shown in the LePeyre et al '055 patent. In applications where the insert-rollers' surface is sandblasted, a suitable roughness of the frictionally-driven insert-rollers 25, 26 is one that provides a frictional contact with power-driven rollers 22, 23 and 24, approximating that of the exterior surfaces of the viscera pinching rollers utilized in the systems of the Willis and Wenstrom et al patents.

At the discharge port of the hopper 19, two transversely positioned, oppositely-rotating feed rollers 35, 36 are fitted extending the width of the unit 10. The purpose of these rollers is to distribute the scallops into the upper ends of the channels 18 in reasonable separation across the width of the machine 10. The feed rollers 35, 36 can be driven by any appropriate means.

An output trough 39 extends widthwise, transversely across the machine 10 adjacent the bases of the inclined rollers channels. The trough 39 serves as a catch basin for the cleaned scallop meat and may be inclined to one side of the machine 10 as shown to transport the cleaned scallop meat away from the machine 10 to an inspection station or other further processing or packaging downstream scallop processing location. A discharge pan 41 is provided below the full length and width of the roller paths 18 of the inclined table 17, as shown, to collect the separated viscera from the rollers. A water spray mechanism (not shown) is provided to lubricate the rollers and to assist in cleaning the removed viscera from the rollers. The sides of the table of the machine 10 are provided with end plates 42, 43 to prevent edge spillage.

In operation, uncooked, shucked scallops deposited into the hopper 19 are passed at a controlled rate through the feed rolls 35, 36 into the upper ends of the channels 18. The inclination of the channels and the rolling action of the rollers causes the scallops to move down the channels 18 longitudinally along the upper surfaces of the bottom rollers 22. The oscillatory motion imparted to the rollers shifts the scallops alternately from side to side within the channels presenting the scallops in constantly changing positions to pinching action of the respective nips between the insert-rollers 25, 26 and the rollers 22 for removal of the viscera. The movement of the scallops down the channels and the separation of the viscera from the meat is facilitated by water spray directed above and below the channels.

In contrast to the shrimp peeling machinery, the angle of incline of the roller paths 18 will generally be more than that used for shrimp and will approximate the angle of incline currently used on conventional eviscerating machines. As shown in FIG. 1, the angle of incline may be made variable by hydraulic means by providing support to the upper end of the inclined table by pistons 44 located adjacent each rear leg 14 and by providing a pivotal connection between the front of the inclined table and the upper ends of the front legs 14.

As is apparent from the foregoing description, the invention provides a method and apparatus for the mechanical separation of viscera from meat in shucked scallops, in which scallop viscera are separated by the pinching action of roller nips during descent of scallops down an inclined path, longitudinally in alignment with the roller axes. Tests run by the inventor with equipment of the type described have been successful, and it is apparent that the method of the invention will present a viable alternative to conventional mechanical separation processes that utilize intermittent tumbling of scallops transversely over a series of pairs of reversely rotating rollers.

It will be appreciated by those skilled in the art to which the invention relates that various substitutions and modifications may be made to the described embodiments, without departing from the spirit and scope of the invention as defined by the appended claims.

What is claimed is:

1. A method of mechanically eviscerating the viscera from the meat of a shucked scallop, comprising the steps of:
introducing a plurality of scallops at a controlled rate into a series of longitudinally aligned inclined channels, each channel being formed between a first roller and a second plurality of rollers, wherein said first rollers in adjacent channels are longitudinally aligned;
moving the scallops from side to side down along the channels while rotating the rollers to rotate the scallop about their axis while progressively pinching and successively removing the viscera, and then cleaning the viscera therefrom; and
rotating the first rollers at a rotational speed different than that of the second rollers.

2. A method of mechanically eviscerating the viscera from the meat of a shucked scallop, comprising the steps of:
introducing a plurality of scallops at a controlled rate into a series of longitudinally aligned inclined channels, each channel being formed between a first roller and a plurality of second rollers;
moving the scallops from side to side down along the channels while rotating the rollers to rotate the scallop about their axis while progressively pinching and successively removing the viscera, and then cleaning the viscera therefrom; and
adjusting the frictional inner action between the bottom and side rollers so as to effectively separate the soft scallop viscera from the soft adductor muscle of the scallops, without significant damage to the muscle, by rendering the surface of the bottom or side rollers, or both, sufficiently frictional to be effective for separating the soft scallop viscera from the soft scallop muscle, but ineffective to peel shrimp, the rendering step comprising knurling the surfaces of the rollers or changing the dimensions between the rollers, or both.

3. A method of mechanically separating the viscera from the meat of a shucked scallop, comprising:
introducing the scallop into a channel formed between longitudinally aligned power-driven rollers, and frictionally-driven insert-rollers positioned in the nips between and in frictional engagement with adjacent ones of the power-driven rollers;
moving the scallop longitudinally down along the channel; and
oscillating the power-driven rollers in the same direction to frictionally drive the insert-rollers in the opposite direction, so as to shift the scallop alternately from one to the other side of the channel, so as to present the scallop alternately to nips between the oscillating rollers and the insert-rollers, and to cause the viscera to be separated from the meat.

4. A method of mechanically separating the viscera from the meat of a shucked scallop, comprising the step of shifting the scallop from side to side while moving it longitudinally down along a channel formed between aligned power-driven parallel side-by-side rollers and insert-rollers positioned in the nips between the side-by-side rollers and indirectly-driven in counter-rotation through frictional contact with the side-by-side rollers, to alternately pinch the viscera in nips formed between the side-by-side rollers and the insert-rollers.

5. A method of mechanically eviscerating the viscera from the meat of a shucked scallop, comprising the steps of
introducing a plurality of scallops at a controlled rate into a series of longitudinally aligned inclined channels, each channel being formed by one of a plurality of power-driven, parallel side-by-side rollers and left and right insert-rollers positioned in the nips between said one power-driven roller and adjacent left and right ones of said power-driven rollers, said insert-rollers being indirectly-driven in counter-rotation to said one power-driven roller by frictional contact with said one power-driven roller and said adjacent left and right ones of said power-driven rollers; and
oscillating the power-driven rollers in alternating directions to move the scallops from side to side down along the channels and to rotate the scallops about their axes while progressively pinching and successively removing the viscera, and then cleaning the viscera therefrom.

6. An apparatus for removing meat from the viscera of a shellfish, comprising:
a plurality of longitudinally aligned power-driven rollers;
a plurality of insert-rollers, forming a channel in between adjacent insert-rollers, said insert rollers positioned in nips between, and engaging with adjacent ones, of said longitudinally-aligned power-driven rollers; and
means for rotating said power-driven rollers to present said shellfish to said nips between the power-driven rollers and the insert-roller, and to cause the viscera to be separated.

7. The apparatus as recited in claim 6 wherein said insert rollers frictionally engage said adjacent power-driven rollers, and wherein said rotating means rotates said power-driven rollers in the same direction to frictionally drive said insert-rollers in the opposite direction, so as to shift shellfish introduced into said channel through the channel.

8. The apparatus, as recited in claim 7, wherein said rotating means oscillate said power-driven rollers so as to shift said shellfish alternately from one side to the other side of the channel as to present said shellfish alternately to said nips between the power-driven rollers and the insert-rollers.

9. The apparatus, as recited in claim 8, further comprising means for uniformly introducing said shellfish into said channels.

10. The apparatus, as recited in claim 9, wherein said power-driven rollers and insert-rollers are inclined so that when said shellfish is introduced into said channels, said shellfish move longitudinally down said channel.

11. The apparatus, as recited in claim 7, wherein said insert-rollers have a surface grade of sufficient roughness to separate said viscera and roe within said viscera from said meat.

12. The apparatus, as recited in claim 6, wherein said insert-rollers have a knurled surface.

13. The apparatus, as recited in claim 6, wherein said power-rollers have a resilient surface and wherein said insert-rollers have a hardened surface.

14. The apparatus, as recited in claim 6,1 wherein said insert-rollers are longitudinally aligned.

15. The apparatus, as recited in claim 7, further comprising means adjusting the friction between said insert-rollers and said power-driven rollers.

16. The apparatus, as recited in claim 6, wherein said insert-rollers have a smaller diameter than said power-driven rollers.

17. The apparatus, as recited in claim 6, wherein said insert-rollers have a different maximum rotational velocity than said power-driven rollers.

18. The apparatus, as recited in claim 6, wherein adjacent insert-rollers are longitudinally aligned.

* * * * *